US010204348B2

(12) United States Patent
Goffinet et al.

(10) Patent No.: US 10,204,348 B2
(45) Date of Patent: Feb. 12, 2019

(54) IDENTIFYING AND RECOMMENDING CONNECTIONS ACROSS MULTIPLE ONLINE SERVICES

(75) Inventors: Chris Goffinet, San Francisco, CA (US); John Sampson, San Francisco, CA (US); Ian Kennedy, Alameda, CA (US); Todd Sampson, San Francisco, CA (US); Emanuel Miller, Castro Valley, CA (US); Steve Ho, Belmont, CA (US); Raymund Ramos, San Pablo, CA (US)

(73) Assignee: OATH INC., New York, NY (US)

( * ) Notice: Subject to any disclaimer, the term of this patent is extended or adjusted under 35 U.S.C. 154(b) by 274 days.

(21) Appl. No.: 12/466,321

(22) Filed: May 14, 2009
(Under 37 CFR 1.47)

(65) Prior Publication Data
US 2010/0312820 A1    Dec. 9, 2010

(51) Int. Cl.
| | | |
|---|---|---|
| G06F 15/16 | (2006.01) | |
| G06Q 30/02 | (2012.01) | |
| H04L 29/08 | (2006.01) | |
| H04H 60/48 | (2008.01) | |

(52) U.S. Cl.
CPC ............ *G06Q 30/02* (2013.01); *H04H 60/48* (2013.01); *H04L 67/104* (2013.01)

(58) Field of Classification Search
CPC ........ G06Q 30/02; H04L 67/104; H04L 60/48
USPC ................. 709/205, 218, 204, 227
See application file for complete search history.

(56) References Cited

U.S. PATENT DOCUMENTS

| | | | | |
|---|---|---|---|---|
| 6,510,430 B1 * | 1/2003 | Oberwager et al. | .......... | 128/921 |
| 6,769,009 B1 * | 7/2004 | Reisman | ....................... | 709/201 |
| 7,630,986 B1 * | 12/2009 | Herz et al. | | |
| 7,711,475 B1 * | 5/2010 | Cona | .................. | G01C 21/3415 |
| | | | | 701/415 |

(Continued)

OTHER PUBLICATIONS

Combining Social Networks and Collaborative Filtering, Henry Kautz, Bart Selman, and Mehul Shah, Coomunication of the ACM, Mar. 1997.*

(Continued)

*Primary Examiner* — David R Lazaro
*Assistant Examiner* — Mariegeorges A Henry
(74) *Attorney, Agent, or Firm* — James J. DeCarlo; Greenberg Traurig, LLP

(57) ABSTRACT

Potential connections from a first user of a first online service to other users of the online service may be recommended by identifying a second online service from a plurality of online services, wherein the first user is a member of the second online service, identifying a second user of the second online service, wherein a connection exists in the second online service between the first user and the second user, and recommending that a connection be established in the first online service between the first user and the second user. Such recommendations may also be generated by identifying a second user and a third user, where the second user and the third user are members of a second online service, a connection exists in the first online service between the first user and the second user, and a connection exists in the second online service between the second user and the third user, and recommending that a connection be established in the first online service between the first user and the third user.

18 Claims, 6 Drawing Sheets

(56) References Cited

U.S. PATENT DOCUMENTS

| | | | |
|---|---|---|---|
| 7,730,216 B1* | 6/2010 | Issa et al. | 709/250 |
| 7,844,671 B1* | 11/2010 | Lawler et al. | 709/206 |
| 7,970,657 B2* | 6/2011 | Morgenstern | 705/26.1 |
| 8,250,096 B2* | 8/2012 | Su et al. | 707/783 |
| 8,874,572 B1* | 10/2014 | Broyles | 707/732 |
| 2005/0171799 A1* | 8/2005 | Hull et al. | 705/1 |
| 2006/0004623 A1* | 1/2006 | Jasti | 705/10 |
| 2008/0051033 A1* | 2/2008 | Hymes | 455/47 |
| 2008/0134042 A1* | 6/2008 | Jankovich | 715/733 |
| 2008/0134053 A1* | 6/2008 | Fischer | 715/747 |
| 2009/0271247 A1* | 10/2009 | Karelin et al. | 705/10 |
| 2010/0088372 A1* | 4/2010 | Shridhar et al. | 709/204 |
| 2010/0174747 A1* | 7/2010 | Farrell et al. | 707/776 |
| 2010/0211642 A1* | 8/2010 | Campagna | 709/206 |
| 2010/0274912 A1* | 10/2010 | Barnfield et al. | 709/229 |

OTHER PUBLICATIONS

"Make New Friend, but Keep the Old"—Recommending People on Social Network Sites, Jilin Chen, Werner Geyer, Casey Dugan, Michael Muller, Ido Guy, CHI 2009—Onelines Relationships.*
Monson, Kyles, Facebook to Launch an IM Client, PC MagAZINE Online, Mar. 15, 2008, Abstract.*

* cited by examiner

IDENTIFYING AND RECOMMENDING CONNECTIONS ACROSS MULTIPLE ONLINE SERVICES

BACKGROUND

The present application relates generally to online social network services, and more particularly to connections between users across multiple online social network services.

Online social networking services, such as FaceBook®, MySpace®, Last.Fm®, LinkedIn®, and the like, are web sites that allow users to create online representations of themselves and establish ties, e.g., connections, with other users. The term "user" is used herein to refer to the representation of a person (or organization) in a social network as well as to a person who uses the social network, e.g., by accessing a web site via a client computer. The connections between users may represent friendship, kinship, business connections, values, dislike, or any other type of relationship.

A social network may be represented graphically, with nodes corresponding to users and vertices (e.g., links) between nodes representing connections. The data and data relationship embodied by such graphical representation may be stored in a memory of a computer system such as a web server. The computer system updates the data and data relationship as new users and connections are added or deleted, and queries the information to find users and their connections in response to requests from users of the social network.

Social networking services display information about users (such as the friends or connections of each user), detailed information that users have provided about themselves, and information about subject matter on which a particular social network focuses (such as schools on FaceBook, media on MySpace, music on Last.fm, and business organizations on LinkedIn). A user's list of friends or connections may be publicly available, but more detailed personal information may be restricted, e.g., accessible only by the user's friends. The social network features may be related specifically to the primary purpose or content of a web site. For example, a music-oriented web site may provide social networking features to allow users to establish connections with other users having similar interests in music. Because social network services are numerous and diverse, a person may be a user of several such services. The services ordinarily identify users by user names that are unique on that service. A person may have different user names on different services, with each user name corresponding to a login account on the corresponding service. Therefore, users of multiple services ordinarily enter their information and create their connections separately on each service. Such efforts are time-consuming and the resulting social networks are fragmented across the different services. Looking up a particular friend, for example, entails remembering or looking up a record of, or searching for a particular social network of which the friend is a member, even if the user is connected to the friend on one or more social networks.

A standardized specification for user login data, called OpenID, has been developed, which allows users to access multiple online services using the same login data, e.g., the same username and password. Although OpenID may be used as a basis for sharing information across online services, developing a broad-based social network based on OpenID would be difficult. It would be desirable, therefore, to allow users to access and share information about their existing social networks across different social network services.

BRIEF SUMMARY OF THE INVENTION

One aspect of the invention features a method of generating a recommended connection between a first user of a first online service and another user, the method including identifying a second online service from a plurality of online services, wherein the first user is a member of the second online service, identifying a second user of the second online service, wherein a connection exists in the second online service between the first user and the second user, generating a recommendation that a connection be established in the first online service between the first user and the second user, and causing display of the recommendation to the first user of the first online service. Embodiments of the invention may include one or more of the following features. Identifying a second online service may include receiving at least one connection from at least one online service of which the first user is a member, and searching the at least one connection for a connection that associates the first user with a corresponding user of a corresponding online service, wherein the second online service comprises the corresponding online service. The second user may include the corresponding user of the corresponding online service. Generating a recommendation may include generating text that describes the second user as a recommended connection for the first user. Causing display of the recommendation may include sending a name of the second user to a client computer system for display on an output device associated with the client computer system as a recommended connection for the first user. The first and second online services may be social networking web sites. The connections may be friend relationships between users of the online services.

Another aspect of the invention features a method of generating a recommended connection from a first user of a first online service to another user, the method including identifying a second user and a third user of one or more online services, where the second user and the third user are members of a second online service, a connection exists in the first online service between the first user and the second user, and a connection exists in the second online service between the second user and the third user, generating a recommendation that a connection be established in the first online service between the first user and the third user, and causing display of the recommendation to the first user of the first online service.

Embodiments of the invention may include one or more of the following features. Identifying a second online service may include receiving at least one connection from at least one online service of which the first user is a member, and searching the at least one connection for a connection that associates the first user with a corresponding user of a corresponding online service, wherein the second online service comprises the corresponding online service. The second user may be the corresponding user of the corresponding online service. Generating a recommendation may include generating text that describes the second user as a recommended connection for the first user. Causing display of the recommendation may include sending a name of the second user to a client computer system for display on an output device associated with the client computer system as a recommended connection for the first user. The first and second online services may be social networking web sites. The connections may be friend relationships between users of the online services.

Another aspect of the invention features a system for generating a recommended connection from a first user of a first online service to another user, the system including a memory for storing computer-executable instructions, and a processor for executing the instructions, the instructions for identifying a second online service from a plurality of online services, wherein the first user is a member of the second online service, identifying a second user of the second online service, wherein a connection exists in the second online service between the first user and the second user, and generating a recommendation that a connection be established in the first online service between the first user and the second user.

Another aspect of the invention features a system for generating a recommended connection from a first user of a first online service to another user, the system comprising a memory for storing computer-executable instructions, and a processor for executing the instructions, the instructions for identifying a second user and a third user of one or more online services, where the second user and the third user are members of a second online service, a connection exists in the first online service between the first user and the second user; and a connection exists in the second online service between the second user and the third user, generating a recommendation that a connection be established in the first online service between the first user and the third user, and causing display of the recommendation to the first user of the first online service.

Yet another aspect of the invention features a computer program product comprising computer-executable instructions for generating a recommended connection for a first user of a first online service, the instructions for identifying a second online service from a plurality of online services, where the first user is a member of the second online service, identifying a second user of the second online service, where a connection exists in the second online service between the first user and the second user, and generating a recommendation that a connection be established in the first online service between the first user and the second user.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 1A:
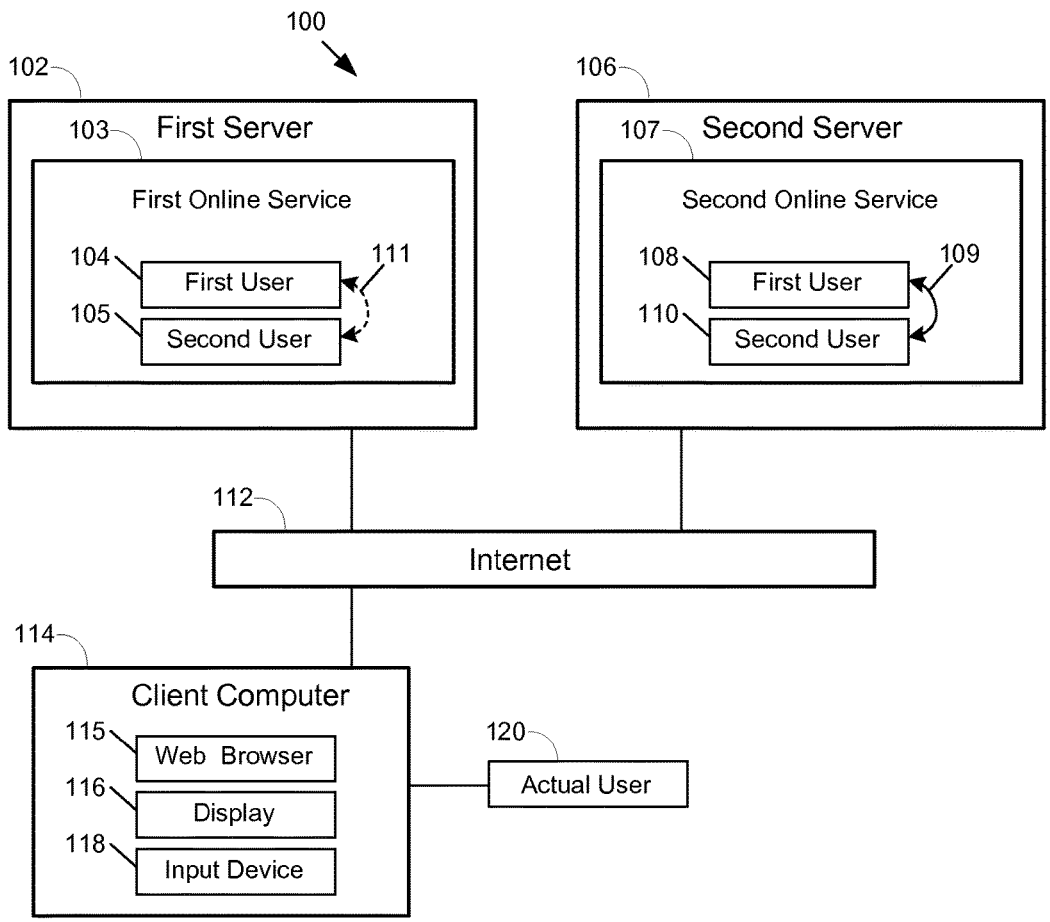
FIGS. 1A and 1B illustrate a recommended connection between users of multiple online services in accordance with embodiments of the invention.
Figure 1B:
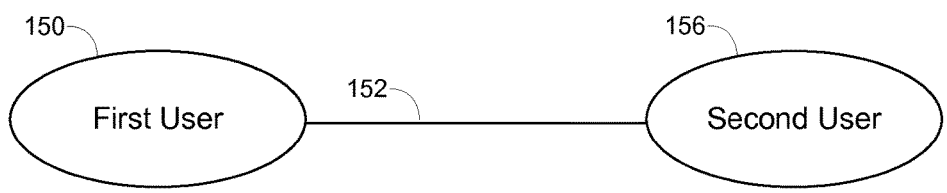

FIGS. 1A and 1B illustrate a recommended connection between users of multiple online services in accordance with embodiments of the invention. In FIG. 1A, a set of networked computers 100 communicate with each other via a network or internet 112, e.g., the Internet. The computers 100 execute computer program code that causes the computers to provide services, e.g., web sites, applications, and user interfaces, which may be invoked by other computers or by users. The computers include a first server 102, which provides a first online service 103; a second server 106, which provides a second online service 107; and a client computer 114, which provides a web browser 115 and interacts with a actual user 120. The client computer 114 displays a user interface of the web browser 115 on a display 116 and receives input from the actual user 120 via an input device 118. As an example, the first online service 103 may be the FaceBook® social networking web site and the second online service 107 may be the Last.Fm® Internet radio and music community web site.

The first online service 103 has a first user account 104 and a second user account 105, which are user accounts or profiles registered with the online service 103. Note that the term "user" as used herein in the context of online services refers to a user account, user profile, or other data associated with an actual user. Therefore, user accounts such as the first or second user accounts 104, 105 may also be referred to simply as "users", e.g., the first user 104 or second user 105, respectively, and is to be understood to be a user account, profile, or other representation of an actual user. An actual user 120 interacts with the client computer 114, which in turn communicates with the servers 102, 106 to send information between the online services 103, 107 and the actual user 120. The first user 104 is representative of an actual user, though not necessarily the actual user 120. The first user 104 need not be logged in, e.g., accessing an online service at any particular time, although the actual user represented by the first user account 104 will ordinarily have accessed the first online service 103 at least once to create the first user account 104. In one example, a user account such as the first user account 104 may be created automatically based upon information known about an actual user, or based upon a user account on another online service, such as the second online service 107.

The first online service 103 may store data, e.g., information about the first user 104 and the second user 105, in a database (not shown), such as an Oracle® or MySQL® relational database or the like, where the database is accessible by the server that implements the online service, e.g., the first server 102. The database provides a persistent record of the state of the online services 103, 107. The stored data, such as representation of the first and second users, ordinarily exist until explicitly deleted by instructions from the online service. For example, the first user 104 may be deleted from the first online service and from the database in response to a command to delete the first user's account. Other storage devices may be used to store the user accounts and other data of the online services. For example, the data may be stored in a memory, such as a flash memory, instead of or in addition to a relational database.

The second online service 107 includes a first user 108 and a second user 110 which, in this example, represent the same actual users as the first user 104 and the second user 105 in the first online service 103. Also included in the second online service 107 is a connection 109, which associates the first user 108 with the second user 110. The connection 109 represents a relationship between the first user 108 and the second user 110, such as friendship, kinship, business connections, values, like, dislike, social, professional, or any other type of relationship. The connection 109 may be established by the second online service 107 in response to a command received from the first user 108 and/or the second user 110. Both of the users to be linked by the connection 109 may be required to agree to the connection, depending upon usage rules of the second online service 107. The connection 109 may be stored in the database associated with the second online service 107, so that the second online service 107 may use the connection in subsequent operations, e.g., in queries to find friends of the first user 108 or friends of the second user 110. Other online services such as the first online service 103 may learn of the connection 109 by querying the second online service 107, e.g., through an application programming interface (API) protocol, as described herein.

In one example, the first user 104 and second user 105 are associated by a recommended connection 111, which is a potential connection that has not been recognized (e.g., stored) as an actual connection. In one example, the recommended connection 111 is inferred from other connections that exist (e.g., are stored) in the online services 103, 107. The recommended connection 111 may become an actual connection if agreed to by the first user 104 and/or the second user 105, according to the rules of the first online service 103. To obtain such agreement, the recommended connection 111 is presented to one or both of the actual users referenced by the recommended connection 111, e.g., the first user 104 and/or the second user 105. In one example, the recommended connection 111 is converted to an actual connection between the first user 104 and second user 105 in response to receipt of approval from one or both of the actual users represented by the first user 104 and second user 105. In another example, approval may also be provided by another user, such as an administrative user or third party user. Approval may be requested, for example, by displaying the approval request via the web browser 115 on the display 116 of the client computer 114. The request may include text to be displayed by the web browser 115 being used by the actual user who corresponds to the first user 104, where the text states that the second user 105 is recommended as a possible connection. The text may further state that the recommendation is based on the first and/or second user's other connections on this or other online service(s) and may identify those other online service(s).

A connection is referred to as "in" or existing in an online service to indicate that the connection is an actual connection that is stored by or otherwise associated with the online service. A connection may be stored in an online service if, for example, a representation of the connection is stored in a database associated with a web server that provides the online service. An online service may, for example, use its own database to store connections between users, and both of the users referenced by a connection may or may not need to be registered users of the service, according to the requirements and capabilities of the online service.

The recommended connection 111 between the first user 104 and the second user 105 may be provided because the connection 109 exists in another online service between the same users. For example, the first user 108 and first user 104 may be the same and the second user 110 and second user 105 may be the same. Otherwise, no connection exists between the first and second users 104, 105 in the first online service 103.

FIG. 1B shows a weighted graph that represents the connections between the first and second users in accordance with embodiments of the invention. The graph may be used to identify recommended connections between a given user and other users. The graph includes a first user node 150 and a second user node 156. Each pair of user nodes is linked by a vertex that corresponds to one or more online services in which actual connections exist between the users represented by the nodes. The first user node 150 is linked to the second user node 156 by a connection 152 that corresponds to an actual connection 111 in the first online service 103 (for purposes of FIG. 1B, assume that the recommended connection 111 has been converted to an actual connection based on sufficient approval by the necessary parties) and also corresponds to the actual connection 109 in the second line service 107. These two connections are represented by a single vertex 152 with a weight of −2 (−1 for the connection 111 plus −1 for the connection 109).

Figure 2A:
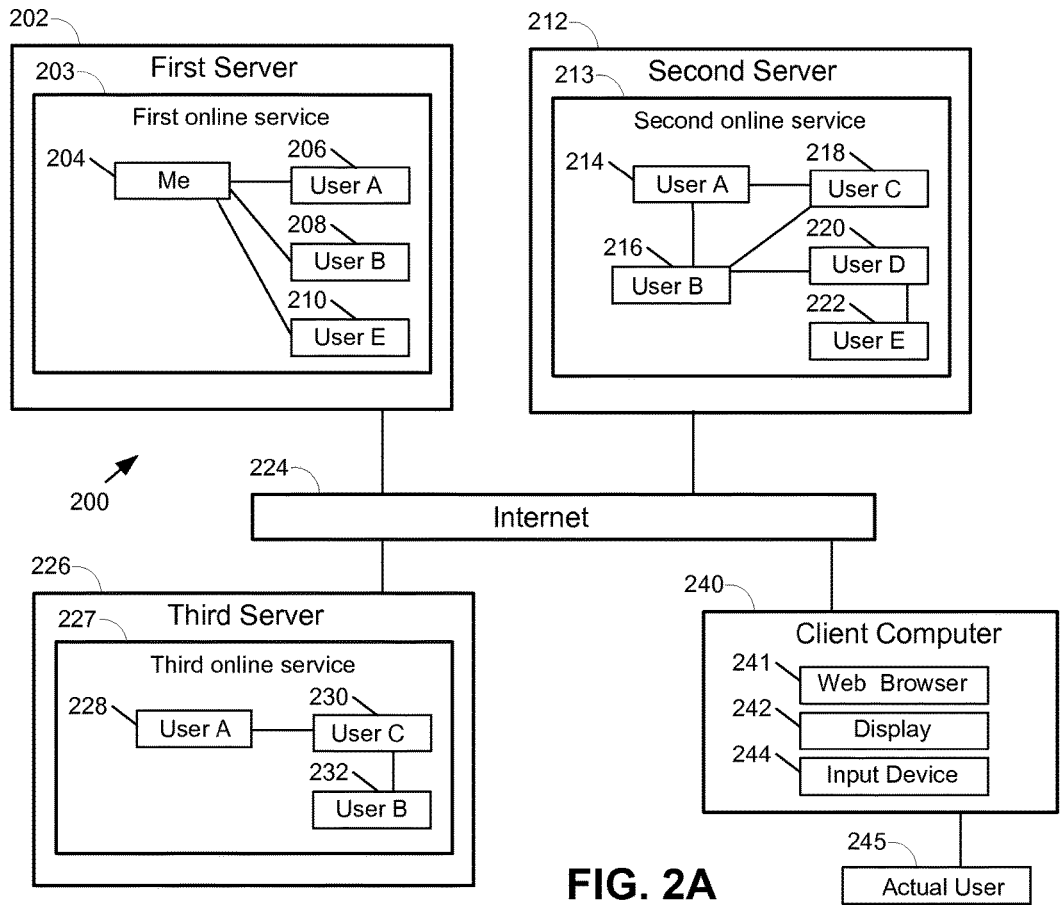
FIGS. 2A and 2B illustrates recommended connections between users of multiple online services in accordance with embodiments of the invention.
Figure 2B:
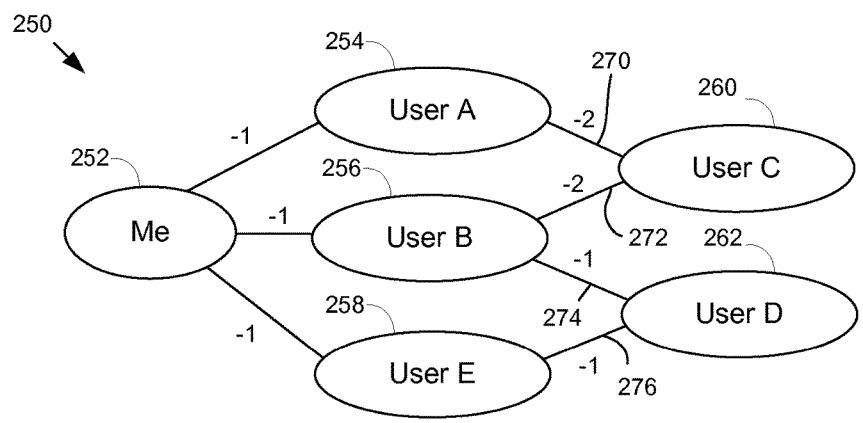

FIGS. 2A and 2B illustrate recommended connection between users of multiple online services in accordance with embodiments of the invention. In FIG. 2A, a set of networked computers 200 communicate with each other via a network or internet 224, e.g., the Internet. The computers 200 include a first server 202 that provides a first online service 203; a second server 212 that provides a second online service 213; a third server 226 that provides a third online service 227; and a client computer 240, which provides a web browser 241, a display 242, and an input device 244 for interacting with an actual user 245. The first, second, and third online services may comprise a variety of online services including, but not limited to, the MyBlogLog® social networking web site, the Twitter® messaging web site, and the Last.Fm® Internet radio and music community web site.

The first online service 203 includes four users: a user Me 204, which corresponds to the actual user 245, a user A 206, a user B 208, and a user E 210. Each of users A, B, and E has an actual connection to the user Me 204. The second online service 213 includes six users: a user A 214, a user B 216, a user C 218, a user D 220, and a user E 222. The third online service 227 includes three users: a user A 228, a user C 230, and a user B 232. Same user names across different online services denote same users. For example, user A 206, user A 214, and user A 228 are the same user. As another example, user B 208, user B 216, user B 232 are the same user.

Initially, there are no connections between the user Me 204 and any of users C or D. Two recommended connections may be generated based upon the existing connections shown in FIG. 2A. A first recommended connection 280 (not shown) would connect the user Me 204 to the user C 230 via the user A 206/user A 228. The first recommended connection 280 may also connect the user Me 204 to the user C 218 via user B 208/user B 216. In either case, the total weight of the potential path from user Me to C is −3, with the Me-A vertex having a weight of −1 and the A-C vertex having a weight of −2 (for the second and third online services 213, 227, both contain the connection A-C). A second recommended connection 282 (not shown) would connect the user Me 204 with the user D through either the user B or through the user E. The recommended connection Me-E-D has a total weight of −2 (−1 for Me-E and −1 for E-D). The recommended connection Me-B-D also has a total weight of −2 (−1 for Me-B and −1 for B-D, since B-D occurs in one service and E-D occurs in one service). Since the total weight of the Me-C connection 280 (−3) is less than the total weight of the Me-D connection (−2), the Me-C connection 280 is the more highly recommended connection than the Me-D connection 282.

FIG. 2B shows a weighted graph 250 that represents the connections between the users shown in FIG. 2A. A node Me 252 represents the user Me 204, a node User A 254 represents the user A 206, 214, 228, a node User B 256 represents the user B 208, 216, 232, a node User E represents the user E 210, 222, a node User C 260 represents the user C 218, 230, and a node User D 262 represents the user D 220. There are vertices from the node Me 252 to the nodes User A 254, User B 256, and User E 258, each with weight −1. A vertex 270 between the nodes User A 254 and User C 260 has weight −2, corresponding to the two services required to establish a connection between user A and user C. A vertex 272 between the nodes User B 256 and User C 260 has weight −2, corresponding to the two services required to establish a connection between user B and user C. A vertex 274 between the nodes User B 256 and User D 262 has weight −1, since only one service is sufficient for a connection between users B and D (the online service 213). A vertex 276 between the nodes User E 258 and User D 262 has weight −1, since only one service is sufficient for a connection between users E and D (the online service 213).

In one example, the weighted graph 250, as known to those of ordinary skill in the art, includes a set of nodes, and each pair of nodes may be connected by a vertex that has an associated numeric weight value. In accordance with embodiments of the invention, each node represents a user, and each vertex corresponds to an actual connection in an online service between the users represented by the two nodes joined by the vertex. That is, each vertex is associated with an online service identifier that represents a particular online service. A potential connection is evaluated based on the number of users separating the given user from the candidate user, and upon the "strength," e.g., the number of different online services that include the vertices of the potential connection. Potential connections with fewer users, e.g., shorter paths, between the given user and the candidate user at the end of the path opposite the given user, are considered to be more desirable than connections with more users. Further, as the number of links between the same two nodes in different online services increases, the value of the connection increases, since occurrence of a connection in more online services means that the connection is more likely to be relevant or related to the given user. That is, connections with vertices that are duplicated in more online services are considered to be better recommendations than connections for which vertices appear in fewer online services.

The users that are more likely to be known by or of interest to a given user are identified by finding the shortest paths from the given user to each candidate user that is linked to the given user by a path of one or more links, where each link corresponds to a connection between two users, at least two of the users are in (e.g., members of) different online services, and each link is associated with a negative weight that corresponds to the number of different online services in which the link occurs. Therefore, to determine the value of a path from a node that represents a given user to a node that represents a candidate user, a single-source shortest paths algorithm, such as the Bellman-Ford algorithm, may be applied to the graph of user connections. The algorithm determines the shortest paths between a given node, e.g., a first user node 150, and other nodes in the graph, e.g., a second user node 156. Each of the other nodes that is reachable by a path from the given node is a candidate node. The condition that connections with vertices that are duplicated in more online services are more desirable is represented by associating a negative weight with each vertex, where the weight corresponds to the negative of the number of different online services that include a connection between the two users represented by the nodes at the ends of the vertex. The result of the shortest-paths algorithm is a list of the shortest paths from the given node to each of the other nodes (e.g., users) in the graph. The recommended connections are generated by selecting a predetermined number of the shortest paths. For example, if the predetermined number is N, then the N recommended connections are the N paths with the N shortest lengths generated by the shortest-paths algorithm (including the effect of the negative weights on the path lengths).

In one example, an online service does not require both users referenced by a connection to be members of the service; that is, the online service may create or recognize connections between two users even if one or both of the users are not members of that online service, but are members of other online services. The online services may provide for linking to or referencing user profiles or accounts stored on other online services. Restrictions may be imposed when connections refer to users that are not members of the service. For example, such non-member users may only be accepted if they are members of another service that is trusted by the first service in some way, or if the other service agrees to provide information about its users via a secure protocol.

An online service may require both of the users linked by a connection in that online service to be members of that online service. In this example, if a connection is to be established in a first online service between a user A of the first online service and a user B of a second online service, then user B must also be a member of, e.g., have an account and user identifier on, the first online service. If user B is not a member of the first online service, e.g., user B is discovered on another online service, then an account for user B may be created automatically on the first service so that the connection can be established in the first service.

Alternatively, online services may not require both of the users linked by a connection to be members of the same online service. That is, in this example, a connection may be established between a user of a first online service and a user of a second online service even if the second user is not a member of the first online service and/or the first user is not a member of the second online service. To implement this feature, the two online services each provide for connection between one of their users and a second user of a different online service, even if the second user is not a member of the first online service.

Figure 3:
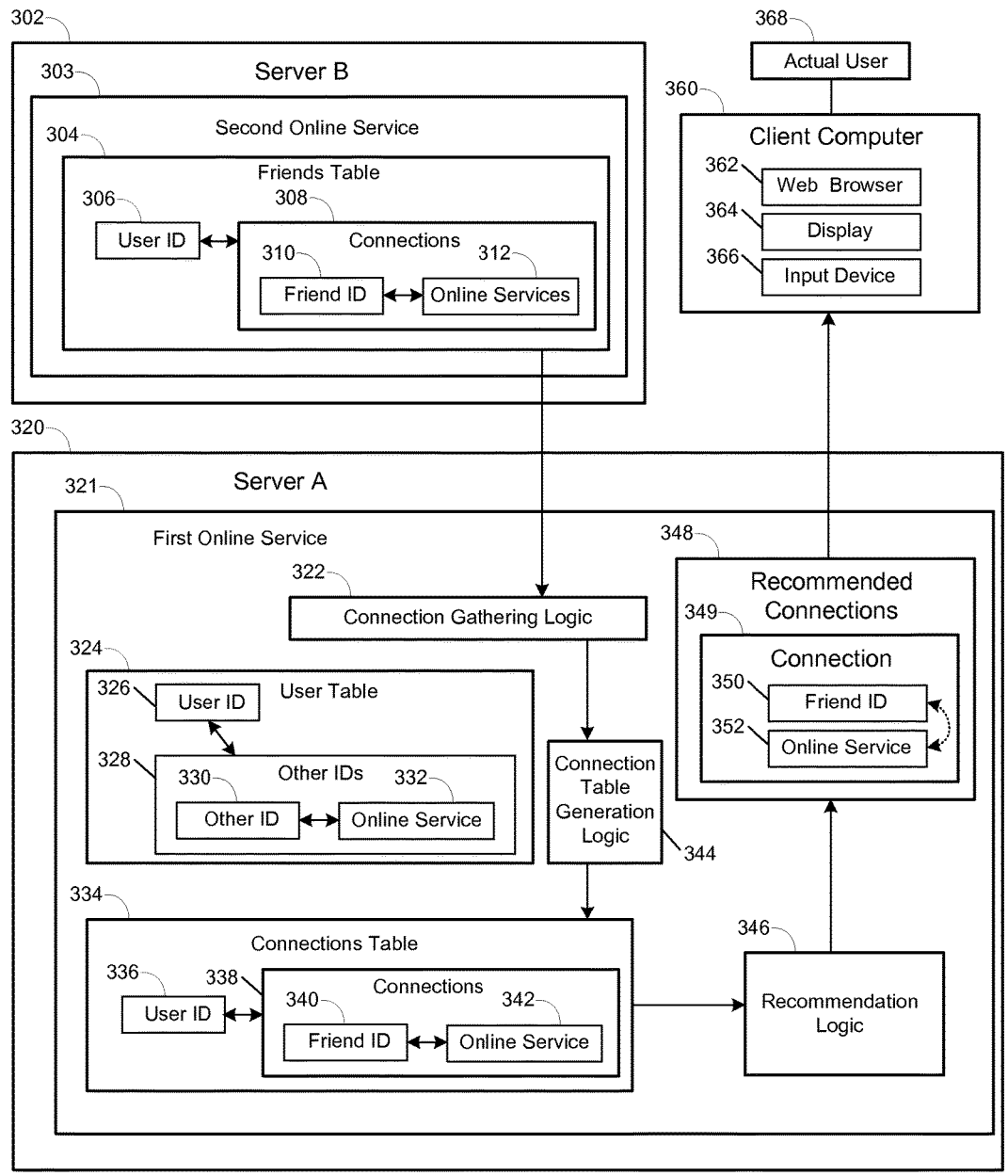
FIG. 3 illustrates logic for recommending connections between users in an online service based on connections in another online service in accordance with embodiments of the invention.

FIG. 3 illustrates logic for recommending connections between users in an online service based on connections in another online service in accordance with embodiments of the invention. A server 320 provides an online service, e.g., MyBlogLog or another social networking service, and includes connection gather logic 322, connection table generation logic 344, recommendation logic 346, and recommendations 348. The connection gathering logic 322 is operable to query other online services hosted by other servers (such as a server 302) for connections of particular users. The connection table generation logic 344 is operable to generate the connections table 334 based upon the gathered connections. The recommendation logic 346 is operable to generate the recommendations 348 based upon the connections table 334. The server 320 includes, uses, or stores a user table 324 and a connections table 334. The tables 324, 334 may be, for example, tables stored in a memory of the server 320 and/or database tables stored in a relational database (which may be located on the server 320 or on a remote database server that communicates with the server 320 via a network).

Each user of an online service may have user accounts on other online services. These other known accounts may be used to identify other online services 303 from which to gather connections for the connections table 334. The other known accounts of each user are enumerated in the user table 324. The other known accounts are stored in the user table 324 in response to, for example, the user providing account user name(s) that he or she uses on another online service, which may occur, for example, when the user creates or updates his or her user profile. The user table 324 includes a user ID 326 for each user of the online service that hosts the user table 324 and one or more other IDs 328 that may be associated with the user. Each of the other IDs 328 includes an ID 330, e.g., the user's user name on the other online service, and an online service name 332, e.g., the name of the other online service.

In one example, the other server 302 provides an online service, e.g., FaceBook or another social networking service. The online service 303 of the other server 302 includes a friends table 304, which lists the friends connections that exist in that service. The friends table 304 may include a user ID field 306 that is associated with a connections object 308. The connections object 308 represents one or more friend users who are friends of the user identified by the user ID 306, and may include a friend ID 310 and, optionally, an online service ID 312, which identifies an online service on which the friend ID 310 resides.

In one example, the connection gathering logic 322 in the server 320 queries the other server 302 for the contents of the friends table 304, and passes the contents of the friends table 304 to the connection table generation logic 344. In turn, the connection table generation logic 344 generates connections for users in the user table 324 of the online service 321 hosted by the server 320 using the friend connections gathered from the other online service 303 of the other server 302. The friends information from the friends table 304 may be provided by a public application programming interface (API) of the other online service 303 or a subset thereof may be provided via a network connection that the server 320 (and other servers on the network) may establish to the server 302 when invoking the public API.

The recommendation logic 346 may use the known connections 338 of each user ID 336 in the connections table 334 to generate recommended additional connections populating the recommendations 348. Each recommended connection 349 is represented as a friend ID 350, e.g., the user name or ID of a user who is recommended as a potential connection for an actual user 368, and an online service name or ID 352, e.g., Facebook, LinkedIn, Last.fm, MyBlogLog, or the like. The recommended connections may be sent via a computer network to a client computer 360, which represents one or more computer (each including a web browser 362, display 364, and input device 366) accessible by the actual user 368. The user 368 may choose to accept or reject each of the recommended connections. If the user accepts a recommended connection, then the accepted connection becomes an actual connection and is stored in the connections table 334 in association with the user ID 336 of the user 368.

Figure 4:
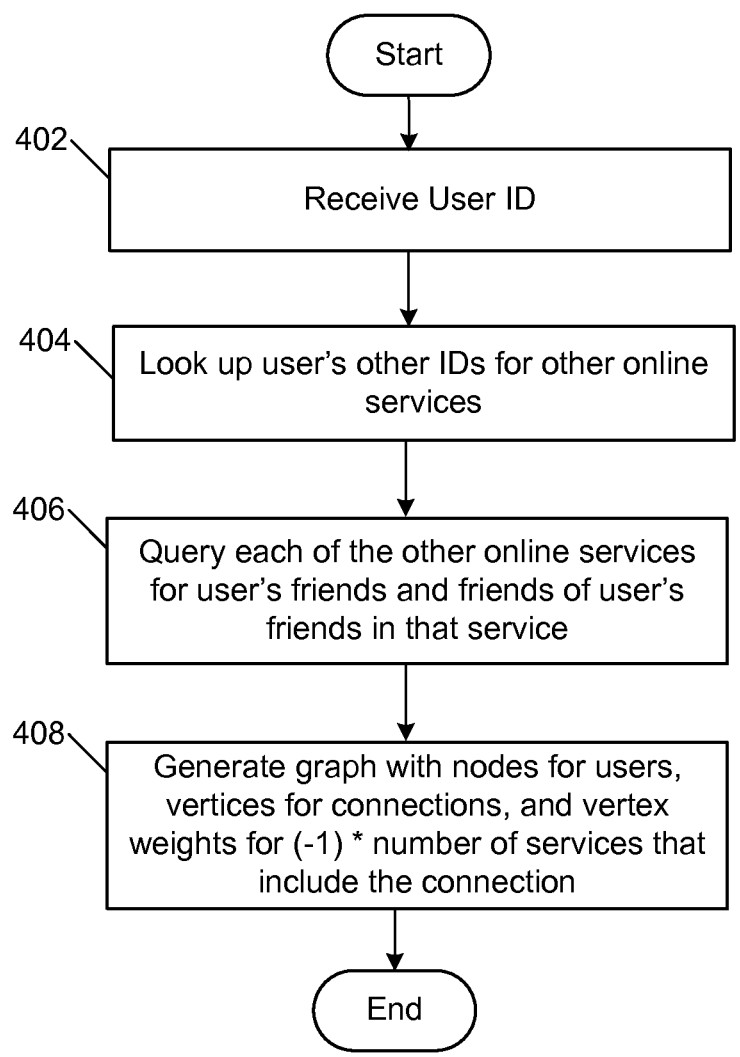
FIG. 4 illustrates a process of generating a graph of connections between users of multiple online services in accordance with embodiments of the invention.

FIG. 4 illustrates a process of generating a graph of connections between users of multiple online services in accordance with embodiments of the invention. The process of FIG. 4 relates to the connection gathering logic 322 of FIG. 3. In one example, the process of FIG. 4 may be implemented using computer program instructions to be executed by a computer system. The process begins at block 402 by receiving a user name or identifier (user ID) that identifies a user for whom potential connections are to be recommended. In block 404, the user table 324 is queried to identify other online services of which the user is a member, and retrieves the user name or identifier for each such online service as well as the name of each such online service. Next at a block 406, each of the online services found in the block 404 is queried for a list of the user's connections (e.g., friends) for that online service. At the block 406, the connections of each of the user's friends, e.g., the friends of the user's friends, at these online services are also obtained. The querying for friends of friends is repeated recursively until all or some predetermined number of connections between the user's friends and friends' friends have been retrieved (that is, all or part of the transitive closure of the friends relations defined by the other online services, starting with the user).

Then at a block 408, a graph may be generated having a starting node that represents the user, and nodes that represent each of the users to which the user is connected according to the online services queried in the block 406. Block 408 adds a vertex to the graph for each connection identified in the block 406, and sets the weight of each vertex to the negative of the number of online services in which the represented connection exists. For example, if a connection between users A and B exists in three different online services, then a vertex is added to the graph between nodes A and B, and the weight of the vertex is set to −3. The graph vertices may be directed, e.g., from the node A that represents a user to the node B that represents a subsequently-identified friend of the user. The process of FIG. 4 terminates after adding the nodes, vertices, and the weights of the vertices to the graph.

Figure 5:
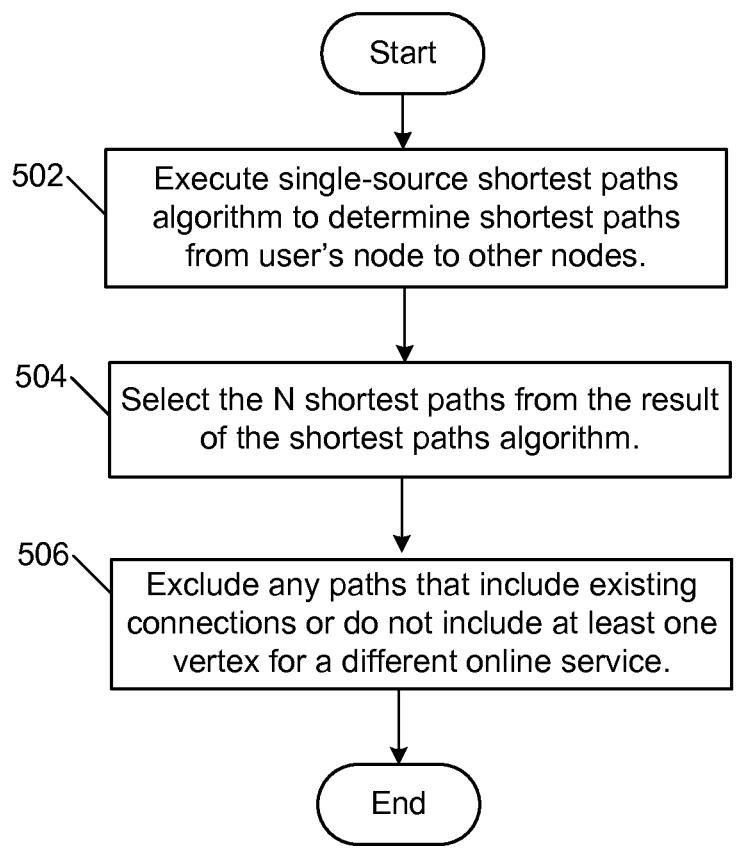
FIG. 5 illustrates a process of recommending connections between users of multiple online services in accordance with embodiments of the invention.

FIG. 5 illustrates a process of recommending connections between users of multiple online services in accordance with embodiments of the invention. The process of FIG. 5 relates to the recommendation logic 346 of FIG. 3. The process begins at a block 502 by executing a single-source shortest paths algorithm that supports negative weights (e.g., the Bellman-Ford algorithm) to determine the shortest paths from the node that represents the user to each of the other nodes reachable from the user's node. The negative weights reduce the path length in proportion to the number of online services that include connections for each vertex. Therefore, the more online services in which a connection occurs, the lower the weight of that connection, and the more likely the connection will be one of the recommended connections. Similarly, paths with fewer nodes (e.g., degrees of separation) between two users are shorter and therefore more likely to be one of the recommended connections (aside from the influence of the weights of the vertexes, since the weights may cause paths with more vertices to be considered shorter than paths with fewer vertices if a path with more vertices has greater weights than the path with fewer vertices). Next, at a block 504, the N shortest paths from the set of shortest paths determined in the block 502 are selected to be the recommended connections. The number N may be a predetermined limit on the number of recommended connections to be generated. Of the N shortest paths selected in the block 502, those paths that correspond to existing connections are excluded (block 506). Excluded paths may also include paths that do not include at least one vertex from another online service from the selected shortest paths, because paths that have vertices exclusively from the user's online service are less likely to represent previously-unknown connections. An online service may use its own methods to generate recommended connections between its users, and the method of FIG. 5 may be used to generate recommended connections between the online service's users and users of other online services.

Figure 6:
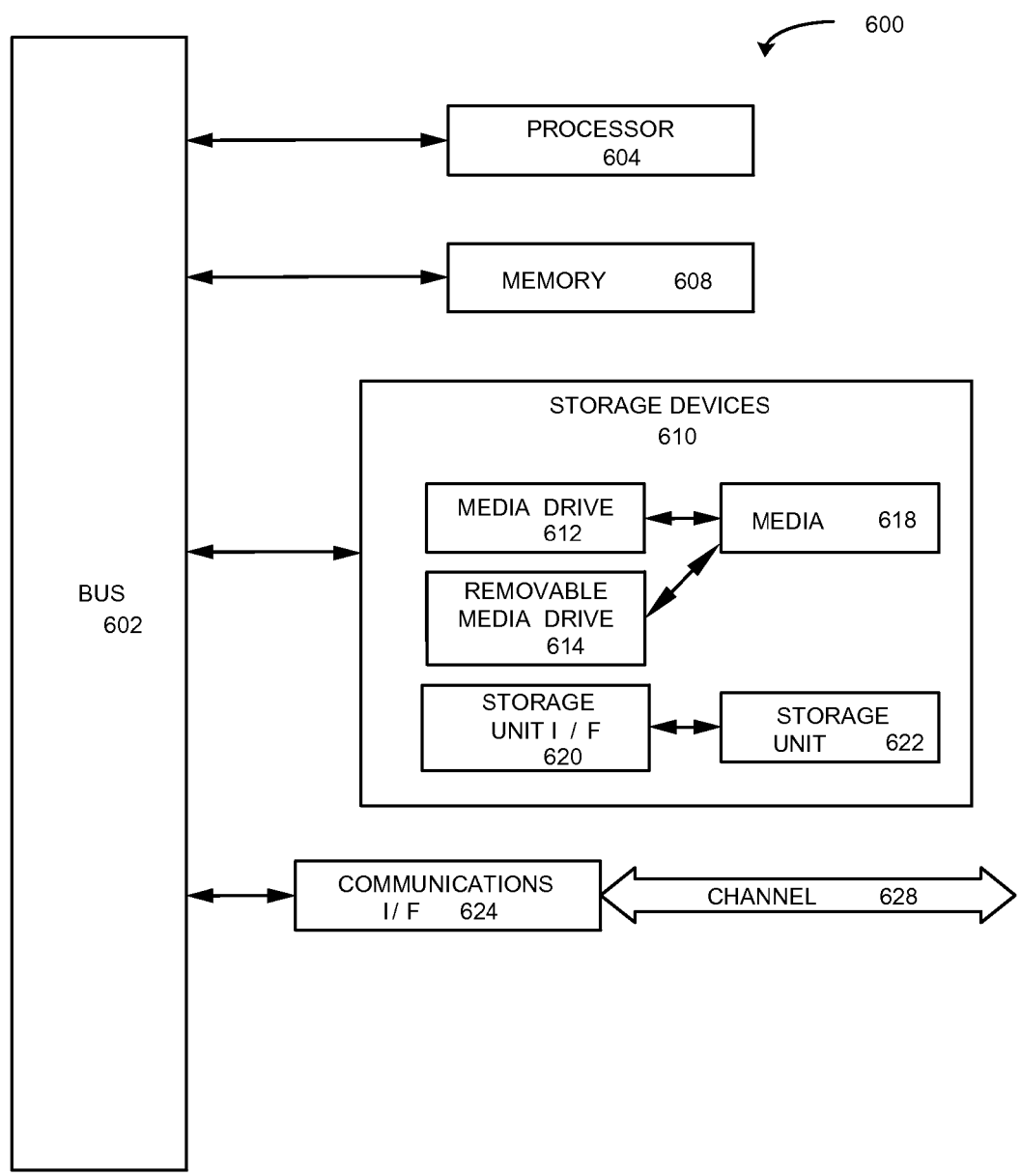
FIG. 6 illustrates a typical computing system that may be employed to implement processing functionality in accordance with embodiments of the invention.

FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

Computing system 600 may also include information storage system 610, which may include, for example, a media drive 612 and a removable storage interface 614. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 608, storage device 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate. It must also be noted that, as used in this specification and the appended claims, the singular forms "a," "an" and "the" include plural referents unless the context clearly dictates otherwise.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method comprising:
   identifying, via a computing device, a second online social network service that is independently operated from a first online social network service;
   identifying, via the computing device, a first user that is a member of the first and second online social network services;
   identifying, by the computing device, a second user that is a member of the first and second online social network services;
   analyzing, via the computing device, the second online social network service, and based on said analysis, determining that a social network connection exists in the second online social network service between the first user and the second user, said social network connection representing an existing linked relationship between the first user and the second user on the second online social network service;
   generating, by the computing device, a recommendation for the first online social network service, said recommendation comprising a request to establish a social network connection between the first user and the second user in the first online social network service;
   communicating, via the computing device, said generated recommendation request to the first online social network service; and
   causing, via the computing device, based on said communicated recommendation, the social network connection between the first user and the second user to be established within the first online social network service, said established connection enabling the first user and the second user to communicate via the first online social network service.

2. The method of claim 1, wherein identifying the second online social network service comprises:
   receiving at least one social network connection from at least one online social network service of which the first user is a member; and
   searching the at least one social network connection for a social network connection that associates the first user with a corresponding user of a corresponding online social network service,
   wherein the second online social network service comprises the corresponding online social network service.

3. The method of claim 2, wherein the second user comprises the corresponding user of the corresponding online social network service.

4. The method of claim 1, wherein generating the recommendation comprises generating text that describes the second user as a recommended social network connection for the first user.

5. The method of claim 1, wherein the first and second online social network services comprise social networking web sites.

6. The method of claim 1, wherein the social network connections comprise social or business relationships between users of the online social network services.

7. A computing device comprising:
   a processor;
   a non-transitory storage medium for tangibly storing thereon program logic for execution by the processor, the program logic comprising:
      logic executed by the processor for identifying, via the computing device, a second online social network service that is independently operated from a first online social network service;

logic executed by the processor for identifying, via the computing device, a first user that is a member of the first and second online social network services;

logic executed by the processor for identifying, by the computing device, a second user that is a member of the first and second online social network services;

logic executed by the processor for analyzing, via the computing device, the second online social network service, and based on said analysis, determining that a social network connection exists in the second online social network service between the first user and the second user, said social network connection representing an existing linked relationship between the first user and the second user on the second online social network service;

logic executed by the processor for generating, by the computing device, a recommendation for the first online social network service, said recommendation comprising a request to establish a social network connection between the first user and the second user in the first online social network service;

logic executed by the processor for communicating, via the computing device, said generated recommendation request to the first online social network service; and logic executed by the processor for causing, via the computing device, based on said communicated recommendation, the social network connection between the first user and the second user to be established within the first online social network service, said established connection enabling the first user and the second user to communicate via the first online social network service.

8. The computing device of claim 7, further comprising:
logic executed by the processor for receiving at least one social network connection from at least one online social network service of which the first user is a member; and logic executed by the processor for searching the at least one social network connection for a social network connection that associates the first user with a corresponding user of a corresponding online social network service, wherein the second online social network service comprises the corresponding online social network service.

9. The computing device of claim 8, wherein the second user comprises the corresponding user of the corresponding online social network service.

10. The computing device of claim 7, wherein generating the recommendation comprises generating text that describes the second user as a recommended social network connection for the first user.

11. The computing device of claim 7, wherein the first and second online social network services comprise social networking web sites.

12. The computing device of claim 7, wherein the social network connections comprise social or business relationships between users of the online social network services.

13. A non-transitory computer readable storage medium tangibly storing thereon computer instructions that when executed by a processor a computing device perform a method comprising:

identifying, via the computing device, a second online social network service that is independently operated from a first online social network service;

identifying, via the computing device, a first user that is a member of the first and second online social network services;

identifying, by the computing device, a second user that is a member of the first and second online social network services;

analyzing, via the computing device, the second online social network service, and based on said analysis, determining that a social network connection exists in the second online social network service between the first user and the second user, said social network connection representing an existing linked relationship between the first user and the second user on the second online social network service;

generating, by the computing device, a recommendation for the first online social network service, said recommendation comprising a request to establish a social network connection between the first user and the second user in the first online social network service;

communicating, via the computing device, said generated recommendation request to the first online social network service; and causing, via the computing device, based on said communicated recommendation, the social network connection between the first user and the second user to be established within the first online social network service, said established connection enabling the first user and the second user to communicate via the first online social network service.

14. The non-transitory computer readable storage medium of claim 13, wherein the computer instructions for identifying the second online social network service comprises:
receiving at least one social network connection from at least one online social network service of which the first user is a member; and searching the at least one social network connection for a social network connection that associates the first user with a corresponding user of a corresponding online social network service, wherein the second online social network service comprises the corresponding online social network service.

15. The non-transitory computer readable storage medium of claim 14, wherein the second user comprises the corresponding user of the corresponding online social network service.

16. The non-transitory computer readable storage medium of claim 13, wherein generating the recommendation comprises generating text that describes the second user as a recommended social network connection for the first user.

17. The non-transitory computer readable storage medium of claim 13, wherein the first and second online social network services comprise social networking web sites.

18. The non-transitory computer readable storage medium of claim 13, wherein the social network connections comprise social or business relationships between users of the online social network services.

* * * * *